(12) United States Patent
Friedman et al.

(10) Patent No.: US 7,491,463 B2
(45) Date of Patent: Feb. 17, 2009

(54) ELECTROCHEMICAL CELL BIPOLAR PLATE WITH SEALING FEATURE

(75) Inventors: Jake Friedman, Storrs, CT (US); Greg A. Hanlon, Windsor, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 651 days.

(21) Appl. No.: 10/985,411

(22) Filed: Nov. 11, 2004

(65) Prior Publication Data

US 2006/0099479 A1    May 11, 2006

(51) Int. Cl.
*H01M 2/08* (2006.01)
*H01M 2/00* (2006.01)
*H01M 2/02* (2006.01)
*H01M 2/14* (2006.01)

(52) U.S. Cl. .............................. 429/35; 429/34; 429/39
(58) Field of Classification Search .................. 429/34, 429/35, 38, 39
See application file for complete search history.

(56) References Cited

U.S. PATENT DOCUMENTS

| | | | |
|---|---|---|---|
| 4,910,100 A * | 3/1990 | Nakanishi et al. | 429/32 |
| 5,316,644 A | 5/1994 | Titterington et al. | 204/284 |
| 5,441,621 A | 8/1995 | Molter et al. | 204/252 |
| 5,683,828 A * | 11/1997 | Spear et al. | 429/13 |
| 5,776,624 A | 7/1998 | Neutzler | 429/26 |
| 5,976,726 A | 11/1999 | Wilkingson et al. | 429/35 |
| 6,017,649 A | 1/2000 | Pondo | 429/35 |
| 6,037,075 A | 3/2000 | Critz et al. | 429/36 |
| 6,057,054 A | 5/2000 | Barton et al. | 429/42 |
| 6,099,716 A | 8/2000 | Molter et al. | 205/687 |
| 6,103,413 A | 8/2000 | Hinton | 429/32 |
| 6,255,012 B1 | 7/2001 | Wilson | 429/38 |
| 6,261,710 B1 | 7/2001 | Marianowski | 429/34 |
| 6,503,653 B2 | 1/2003 | Rock | 429/35 |
| 6,706,436 B2 | 3/2004 | Molter | 429/34 |
| 2003/0186106 A1 | 10/2003 | Frank et al. | |
| 2003/0203260 A1 | 10/2003 | Lee | 429/26 |
| 2005/0208364 A1 | 9/2005 | Nakagawa et al. | 429/38 |

FOREIGN PATENT DOCUMENTS

| | | |
|---|---|---|
| EP | 1284512 | 2/2003 |
| WO | WO 02/075893 A2 | 9/2002 |

OTHER PUBLICATIONS

JP abstract for Publication No. 2004047451 dated Feb. 2004, Applicant Honda Motor Co. LTD.
International Search Report PCT/US2005/035269 dated Sep. 28, 2005.
PCT/US2005/040456, Search Report Nov. 7, 2005.

* cited by examiner

*Primary Examiner*—Patrick Ryan
*Assistant Examiner*—Julian Mercado
(74) *Attorney, Agent, or Firm*—Cantor Colburn LLP

(57) ABSTRACT

A bipolar plate for an electrochemical cell having a first side with a first fluid flow region bordered by a first sealing region, and a second side with a second fluid flow region bordered by a second sealing region is disclosed. The first and second sealing regions each include a plurality of non-continuous sealing features having overlapping ends that extend around the perimeter of the respective fluid flow region.

11 Claims, 10 Drawing Sheets

ELECTROCHEMICAL CELL BIPOLAR PLATE WITH SEALING FEATURE

BACKGROUND OF THE INVENTION

The present disclosure relates generally to bipolar plates for electrochemical cells, and particularly to sealing features for bipolar plates.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exits cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catatlyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells may be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode-assembly", or "MEA") typically has a first flow field in fluid communication with the cathode and a second flow field in fluid communication with the anode. The MEA may furthermore be supported on both sides by screen packs or bipolar plates that are disposed within, or that alternatively define, the flow fields. Screen packs or bipolar plates may facilitate fluid movement to and from the MEA, membrane hydration, and may also provide mechanical support for the MEA.

In order to maintain intimate contact between cell components under a variety of operational pressures and over long time periods, uniform compression may be applied to the cell components. Pressure pads or other compression means are often employed to provide even compressive force from within the electrochemical cell.

While existing internal components are suitable for their intended purposes, there still remains a need for improvement, particularly regarding the sealing of internal components at high operating pressures. Accordingly, a need exists for improved internal cell components of an electrochemical cell, and particularly bipolar plates, that can operate at sustained high pressures, while offering a low profile configuration.

BRIEF DESCRIPTION OF THE INVENTION

Embodiments of the invention include a bipolar plate for an electrochemical cell having a first side with a first fluid flow region bordered by a first sealing region, and a second side with a second fluid flow region bordered by a second sealing region. The first and second sealing regions each include a plurality of non-continuous sealing features having overlapping ends that extend around the perimeter of the respective fluid flow region.

Other embodiments of the invention include an electrochemical cell having a plurality of membrane-electrode-assemblies (MEAs) alternatively arranged with a plurality of flow field members between a first cell separator plate and a second cell separator plate. The plurality of flow field members include a bipolar plate having a first side with a first fluid flow region bordered by a first sealing region, and a second side with a second fluid flow region bordered by a second sealing region. The first and second sealing regions each include a plurality of non-continuous sealing features having overlapping ends that extend around the perimeter of the respective fluid flow region.

BRIEF DESCRIPTION OF THE DRAWINGS

Referring to the exemplary drawings wherein like elements are numbered alike in the accompanying FIGS.

DETAILED DESCRIPTION OF THE INVENTION

Embodiments of the invention provide a bipolar plate for an electrochemical cell, where the bipolar plate has a sealing region about its active area defined by an arrangement of non-continuous sealing features, such as slots, ridges, or a series of repetitive patterns, for example, that have overlapping ends.

Figure 1:
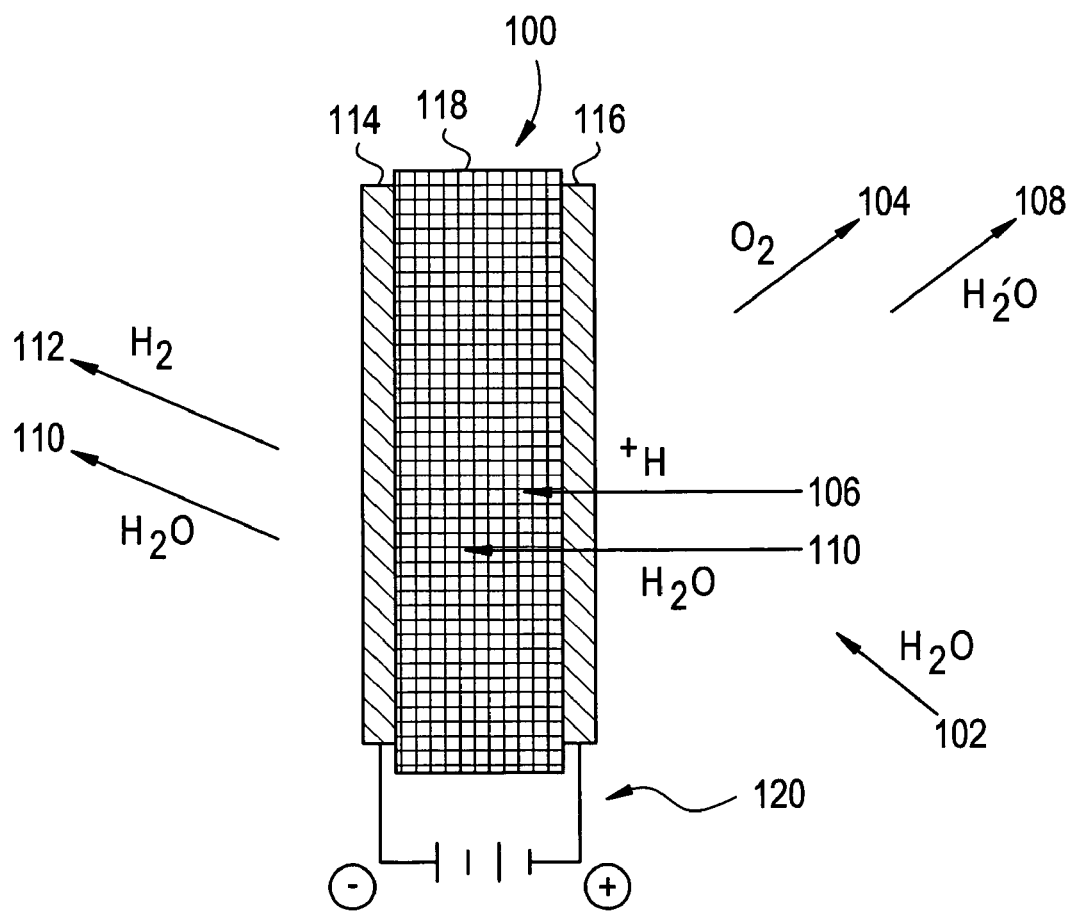
FIG. 1 depicts a schematic diagram of a partial electrochemical cell showing an electrochemical reaction for use in accordance with embodiments of the invention.
Figure 2:
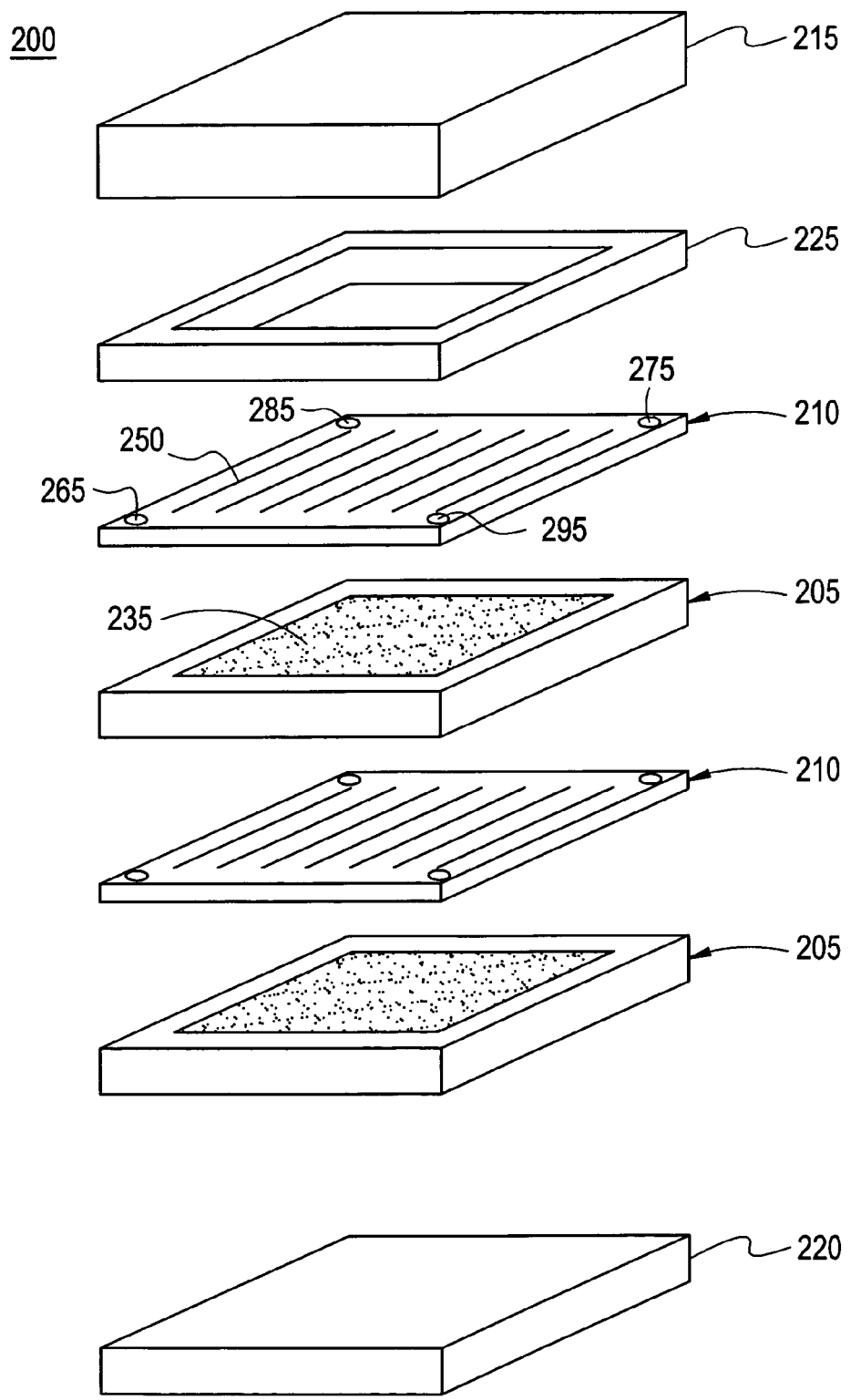
FIG. 2 depicts an exploded assembly isometric view of an exemplary electrochemical cell in accordance with embodiments of the invention.
Figure 3:
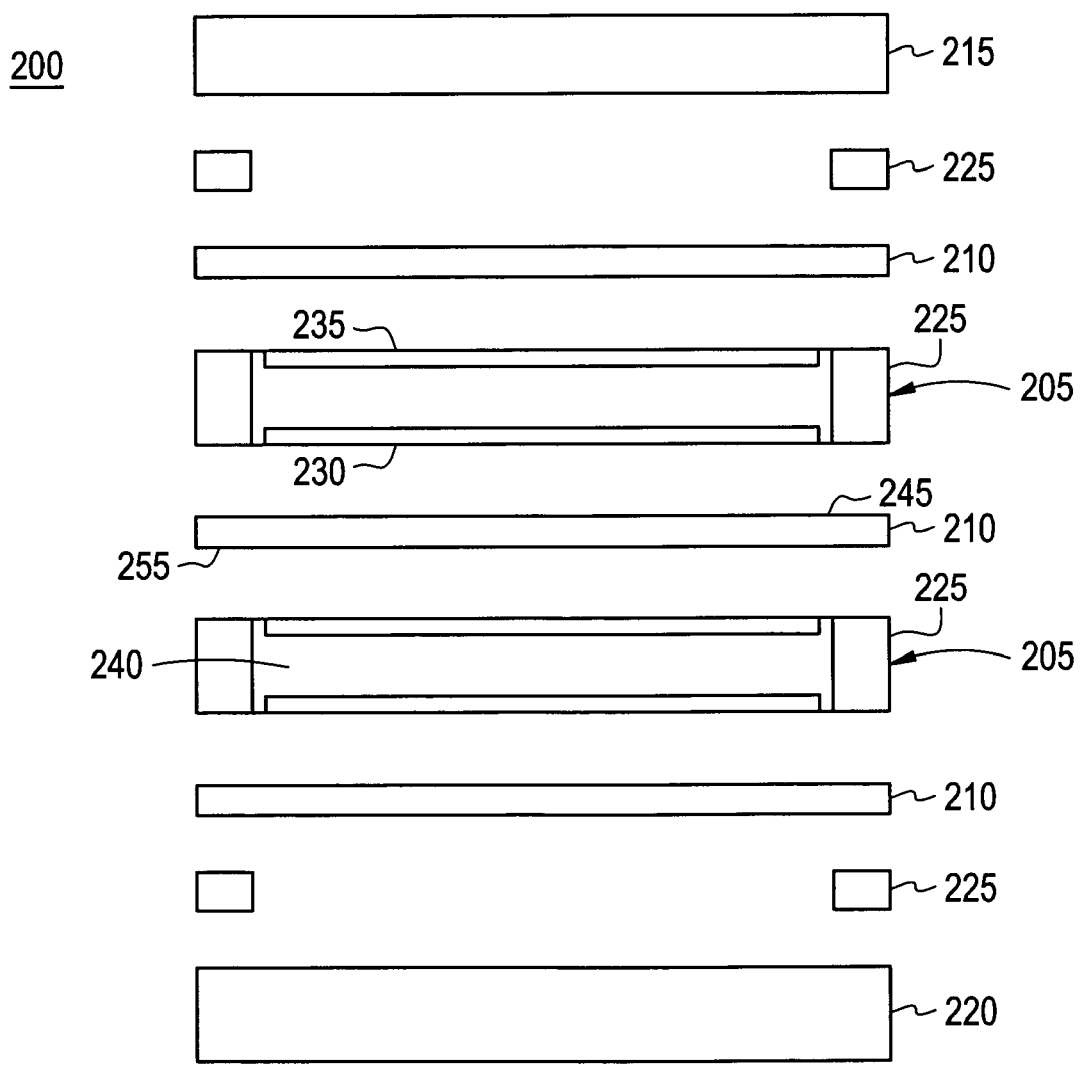
FIG. 3 depicts an exploded assembly section view similar to the assembly of FIG. 2.

Referring first to FIGS. 2 and 3, an exemplary electrochemical cell (cell) 200 that may be suitable for operation as an anode feed electrolysis cell, cathode feed electrolysis cell, fuel cell, or regenerative fuel cell is depicted in an exploded assembly isometric view. Thus, while the discussion below may be directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 A/ft$^2$ (amperes per square foot) and about 4,000 A/ft$^2$. When used as a fuel cells power outputs range between about 0.4 volts and about 1 volt, and between about 0.1 A/ft$^2$ and about 10,000 A/ft$^2$. The number of cells within the stack, and the dimensions of the individual cells is scalable to the cell power output and/or gas output requirements. Accordingly, application of electrochemical cell 200 may involve a plurality of cells 200 arranged electrically either in series or parallel depending on the application. Cells 200 may be operated at a variety of pressures, such as up to or exceeding 50 psi (pounds-per-square-inch), up to or exceeding about 100 psi, up to or exceeding about 500 psi, up to or exceeding about 2500 psi, or even up to or exceeding about 10,000 psi, for example.

In an embodiment, cell 200 includes a plurality of membrane-electrode-assemblies (MEAs) 205 alternatively arranged with a plurality of flow field members 210 between a first cell separator plate 215 and a second cell separator plate 220. In an embodiment, flow field members 210 are bipolar plates, which are also herein referenced by numeral 210. While FIGS. 2 and 3 depict bipolar plates 210 having an illustrated configuration, it is intended that bipolar plates 210 may be a unitary plate, such as that depicted in FIGS. 4 and 5, which is discussed in more detail below, or may be a laminated arrangement of layers, such as that depicted in FIG. 6, which is also discussed in more detail below. Gaskets 225 may be employed generally for enhancing the seal between the first and second cell separator plates 215, 220 and the associated bipolar plate 210, and between MEA 205 and an adjacent bipolar plate 210.

MEA 205 has a first electrode (e.g., anode, or oxygen electrode) 230 and a second electrode (e.g., cathode, or hydrogen electrode) 235 disposed on opposite sides of a proton exchange membrane (membrane) 240, best seen by referring to FIG. 3. Bipolar plates 210, which are in fluid communication with electrodes 230 and 235 of an adjacent MEA 205, have a structure, to be discussed in more detail below, that define the flow fields adjacent to electrodes 230 and 235, and the sealing thereof. The cell components, particularly cell separator plates (also referred to as manifolds) 215, 220, bipolar plates 210, and gaskets 225, may be formed with suitable manifolds or other conduits for fluid flow.

In an embodiment, membrane 240 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly (oxyethylene-co-oxypropylene) glycol monoether, and poly (oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 230 and 235 may comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys of at least one of the foregoing catalysts, and the like. Electrodes 230 and 235 may be formed on membrane 240, or may be layered adjacent to, but in contact with, membrane 240.

Figure 4:
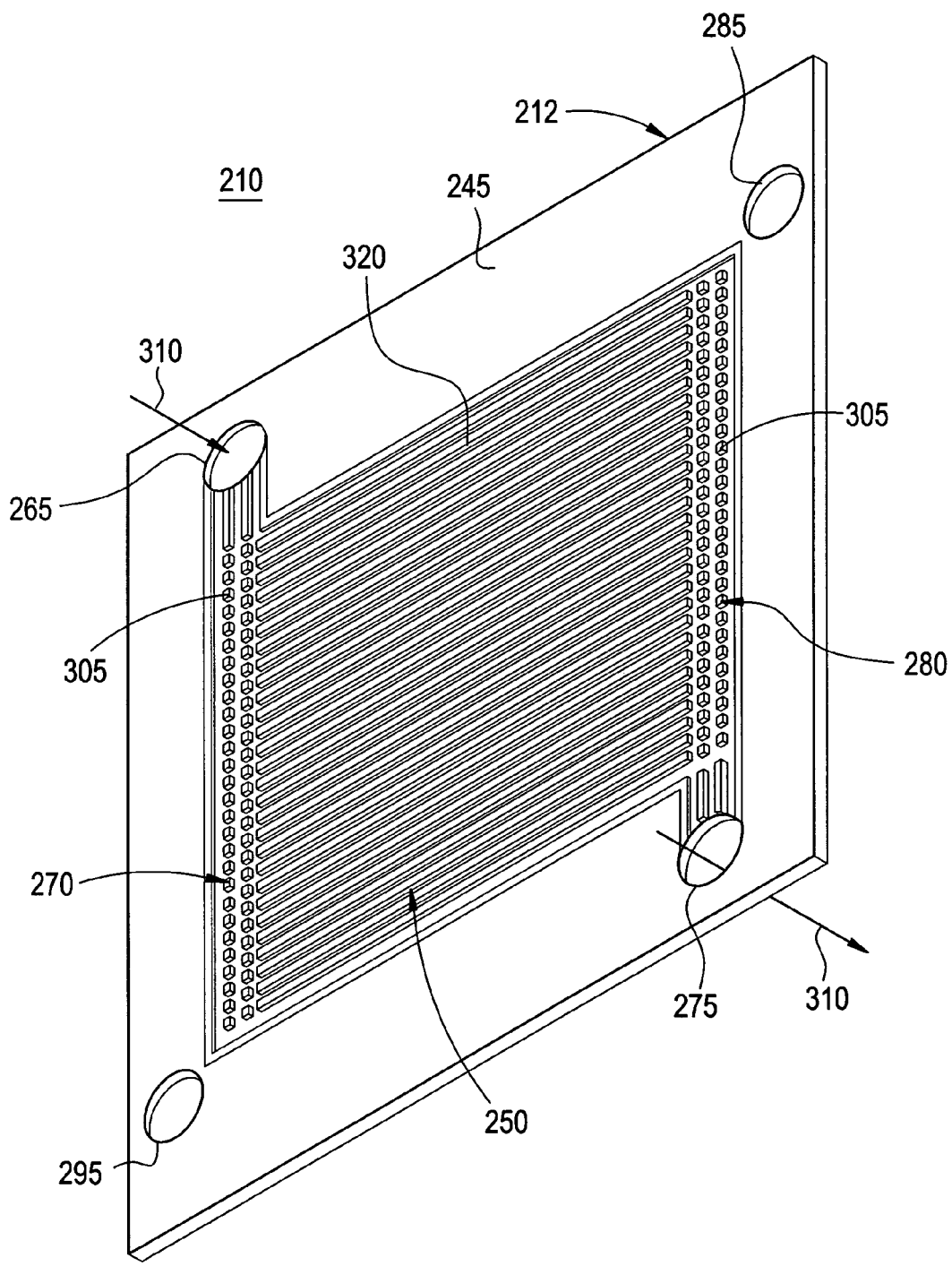
FIG. 4 depicts an isometric view of one side of a unitary bipolar plate for use in accordance with embodiments of the invention.
Figure 5:
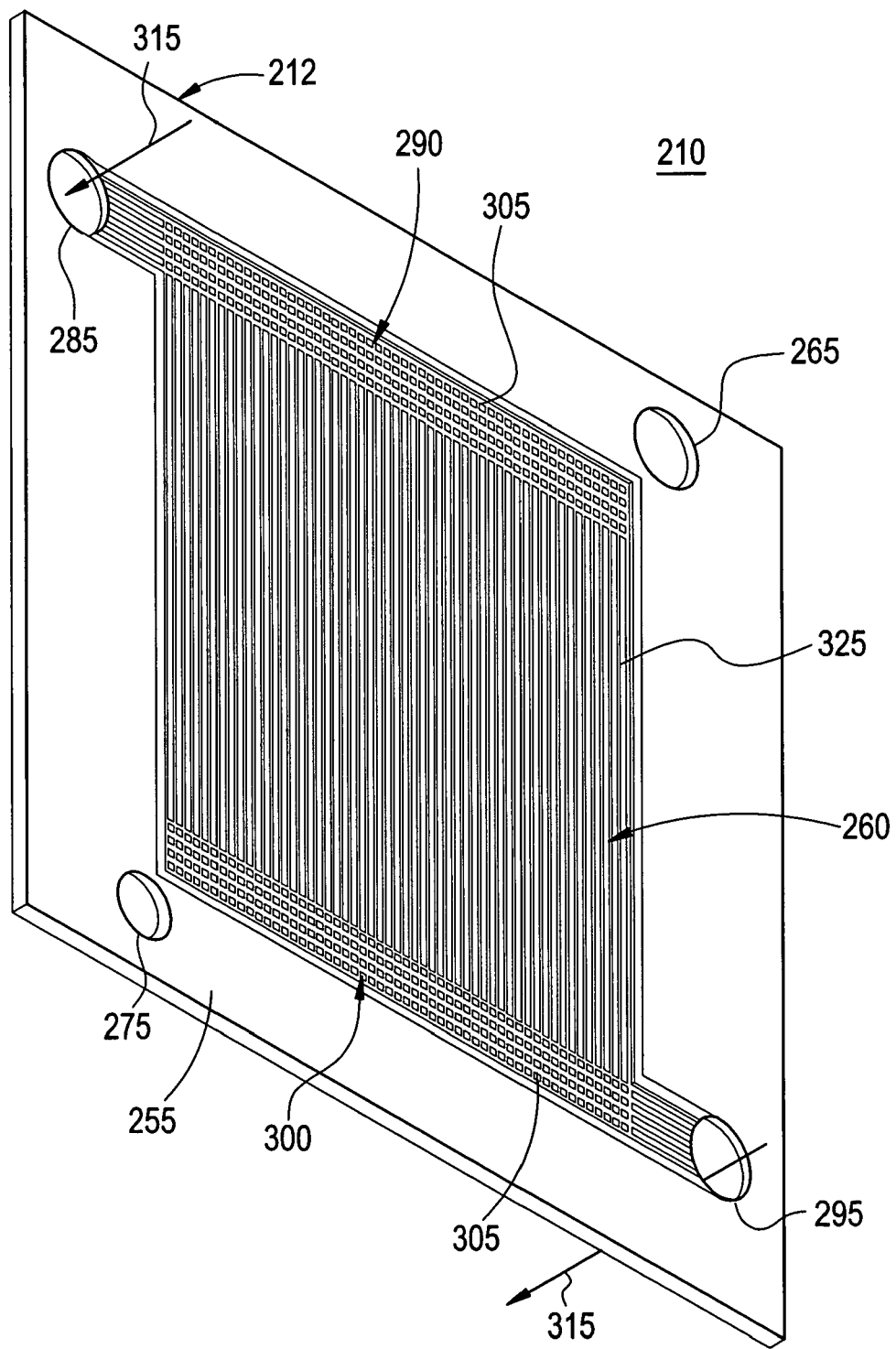
FIG. 5 depicts an isometric view of another side of the unitary bipolar plate of FIG. 4.

Referring now to FIGS. 4 and 5, bipolar plate 210 may be made from a unitary plate 212 of titanium, zirconium, stainless steel, or any other material found to be suitable for the purposes disclosed herein, such as niobium, tantalum, carbon steel, nickel, cobalt, and associated alloys, for example. FIG. 4 depicts a first side 245 (front side view) of the unitary plate 212 having a first plurality of flow channels 250 oriented in a first direction, and FIG. 5 depicts a second side 255 (rear side view) of the same unitary plate 212 having a second plurality of flow channels 260 oriented in a second different direction. The first side 245 includes a first inlet port 265 in fluid communication with a first inlet header channel 270 that extends across one end of the first plurality of flow channels 250, and a first outlet port 275 in fluid communication with a first outlet header channel 280 that extends across the other end of the first plurality of flow channels 250. The second side 255 includes a second inlet port 285 in fluid communication with a second inlet header channel 290 that extends across one end of the second plurality of flow channels 260, and a second outlet port 295 in fluid communication with a second outlet header channel 300 that extends across the other end of the second plurality of flow channels 260. In an embodiment, each header channel 270, 280, 290, 300 includes a support surface 305, or a plurality of support surfaces 305, sufficient to support the MEA 205 at a desired operating pressure, while providing a fluid flow channel from one end of the respective header channel to the other end.

The first inlet port 265, the first inlet header channel 270, the first plurality of flow channels 250, the first outlet header channel 280, and the first outlet port 275, collectively define a first fluid flow path (flow field), depicted generally as arrow 310, on the first side 245 of unitary plate 212. Similarly, the second inlet port 285, the second inlet header channel 290, the second plurality of flow channels 260, the second outlet header channel 300, and the second outlet port 295, collectively define a second fluid flow path (flow field), depicted generally as arrow 315, on the second side 255 of unitary plate 212. As depicted in FIGS. 4 and 5, the first flow path 310 is isolated from (absent fluid communication with) the second flow path 315.

In an embodiment, and as a result of a chemical etching process, or any other material removal process suitable for the purposes disclosed herein, the first side 245 also includes a first plurality of support ridges 320 disposed in an alternating arrangement with the first plurality of flow channels 250, and the second side 255 includes a second plurality of support ridges 325 disposed in an alternating arrangement with the second plurality of flow channels 260.

Figure 6:
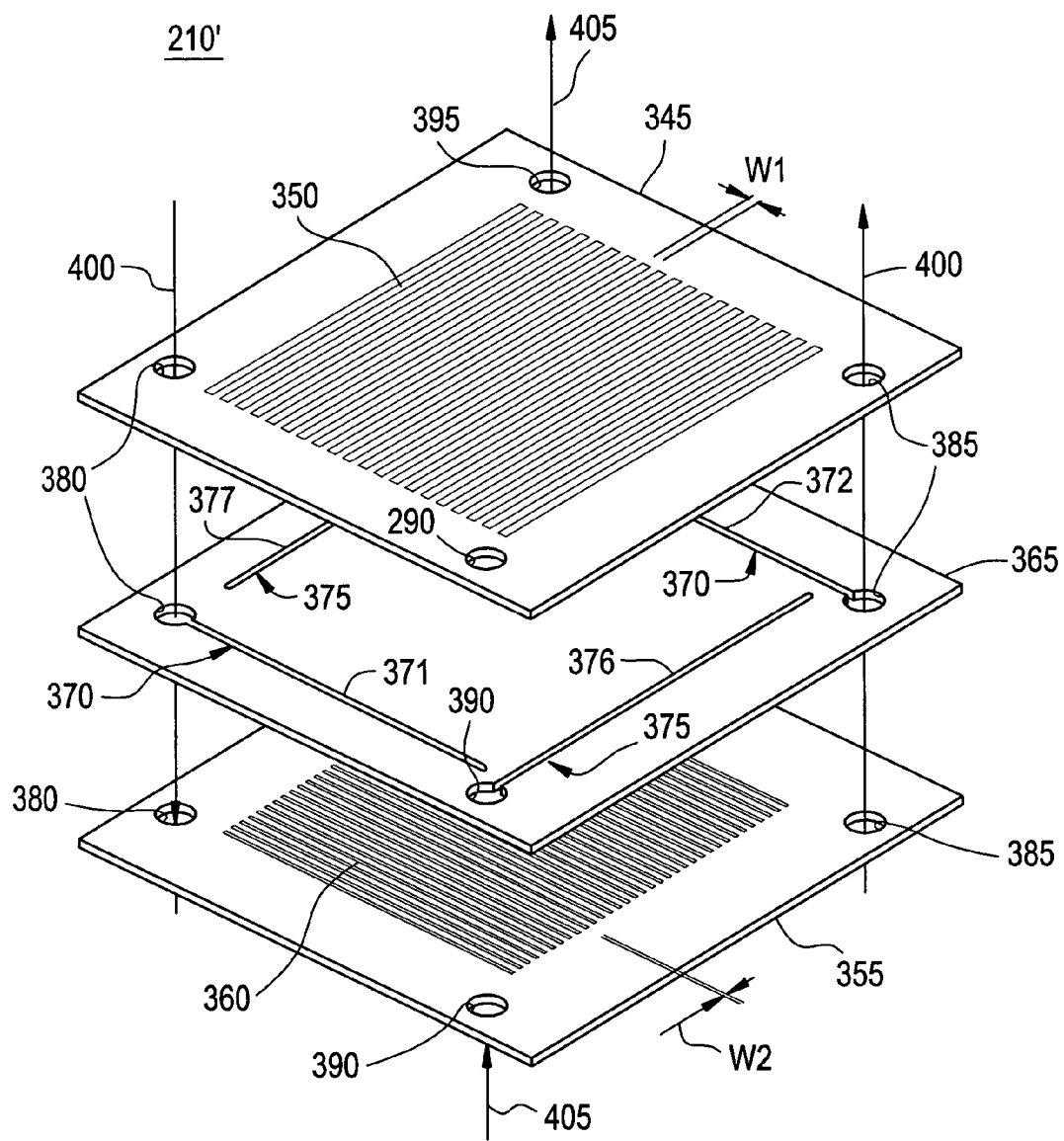
FIG. 6 depicts an exploded assembly isometric view of a bipolar plate arrangement for use in accordance with embodiments of the invention.

Alternatively to FIGS. 4 and 5, and referring now to FIG. 6, bipolar plate 210 may be replaced with bipolar plate 210', which may be a laminated arrangement of three or more layers bonded together, where a first layer 345 has a first plurality of through channels 350 oriented in a first direction, a second layer 355 has a second plurality of through channels 360 oriented in a second different direction, and a third layer 365 disposed between and bonded to the first 345 and second 355 layers. The third layer 365 includes a first set of header channels 370 in fluid communication with the first plurality of channels 350, and a second set of header channels 375 in fluid communication with the second plurality of channels 360. The first set of header channels 370 includes a first through channel 371 extending from a first inlet port 380 across the ends of the first plurality of channels 350, and a second through channel 372 extending from a first outlet port 385 across the opposite ends of the first plurality of channels 350.

The second set of header channels 375 includes a third through channel 376 extending from a second inlet port 390 across the ends of the second plurality of channels 360, and a fourth through channel 377 extending from a second outlet port 395 across the opposite ends of the second plurality of channels 360. As used herein, the term through channel refers to the presence of a slot or a hole that is made in the respective part (layer). As depicted in FIG. 6, the first 271, second 272, third 276, and fourth 277, through channels are all isolated from each other. Accordingly, first inlet port 380 and a first outlet port 385 are in fluid communication with the first set of header channels 370, and second inlet port 390 and second outlet port 395 are in fluid communication with the second set of header channels 375. As discussed previously, bipolar plate 210' may be made of niobium, zirconium, tantalum, titanium, carbon steel, stainless steel, nickel, cobalt, and associated alloys, for example. In view of the interchangeability of bipolar plates 210 and 210', it will be appreciated that a general reference to bipolar plate 210 is intended to also encompass a reference to bipolar plate 210'.

In an embodiment, first 345, second 355, and third 365, layers are diffusion bonded together such that the first inlet port 380, the first through channel 371, the first plurality of through channels 350, the second through channel 372, and the first outlet port 385, define a first fluid flow path (flow field) 400. Similarly, the second inlet port 390, the third through channel 376, the second plurality of through channels 360, the fourth through channel 377, and the second outlet port 395, define a second fluid flow path (flow field) 405. The bonding between the first 345, second 355, and third 365, layers of bipolar plate 210 is such that fluid communication is prevented between the first fluid flow path 400 and the second fluid flow path 405.

The embodiments depicted in FIGS. 4, 5 and 6 show a first direction of the first plurality of channels 250, 350 oriented about 90 degrees to a second direction of the second plurality of channels 260, 360. However, embodiments of the invention are not limited to a 90-degree differential, and the scope of the invention is not intended to be so limited.

Also, the embodiments depicted in FIGS. 4, 5 and 6 show a first inlet port 265, 380 and a first outlet port 275, 385 diagonally disposed with respect to a fluid flow therebetween, where the fluid flow follows an edge-to-edge flow direction as defined by the first plurality of channels 250, 350. Similarly, second inlet port 285, 390 and second outlet port 295, 395 are shown diagonally disposed with respect to a fluid flow therebetween. Such a diagonal arrangement of inlet and outlet ports produces a uniform flow path length from inlet to outlet, regardless of whether the fluid flow travels along the flow channel closest to the inlet port or farthest from the inlet port, however, the scope of the invention is not intended to be so limited and may include other geometric configurations.

Furthermore, the embodiments depicted in FIGS. 4, 5 and 6 illustrate a linear arrangement of a first 250, 350 and a second 260, 360 plurality of flow channels in the first 245 and second 255 sides or the first 345 and second 355 layers, respectively. However, it will be appreciated that the scope of the invention is not so limited, and that the invention may also apply to pluralities of flow channels having non-linear configurations.

Embodiments of the invention are depicted in FIGS. 4, 5 and 6 having illustrative slot widths for the first plurality of flow channels 250, 350 and the second plurality of flow channels 260, 360, however, it will be appreciated that this is illustrative only and that any width flow channel may be employed that are suitable for the purposes disclosed herein. For example, where first side 245 (or first layer 345) is adjacent first electrode 230 (the oxygen electrode), it may be desirable to have first width w1 greater than second width w2 (see FIG. 6 for example), thereby enabling process water to easily flow through the wider slots of first flow field 300 (or first flow path 400), while still enabling hydrogen gas to easily flow through the narrower slots of second flow field 305 (or second flow path 405).

Figure 7:
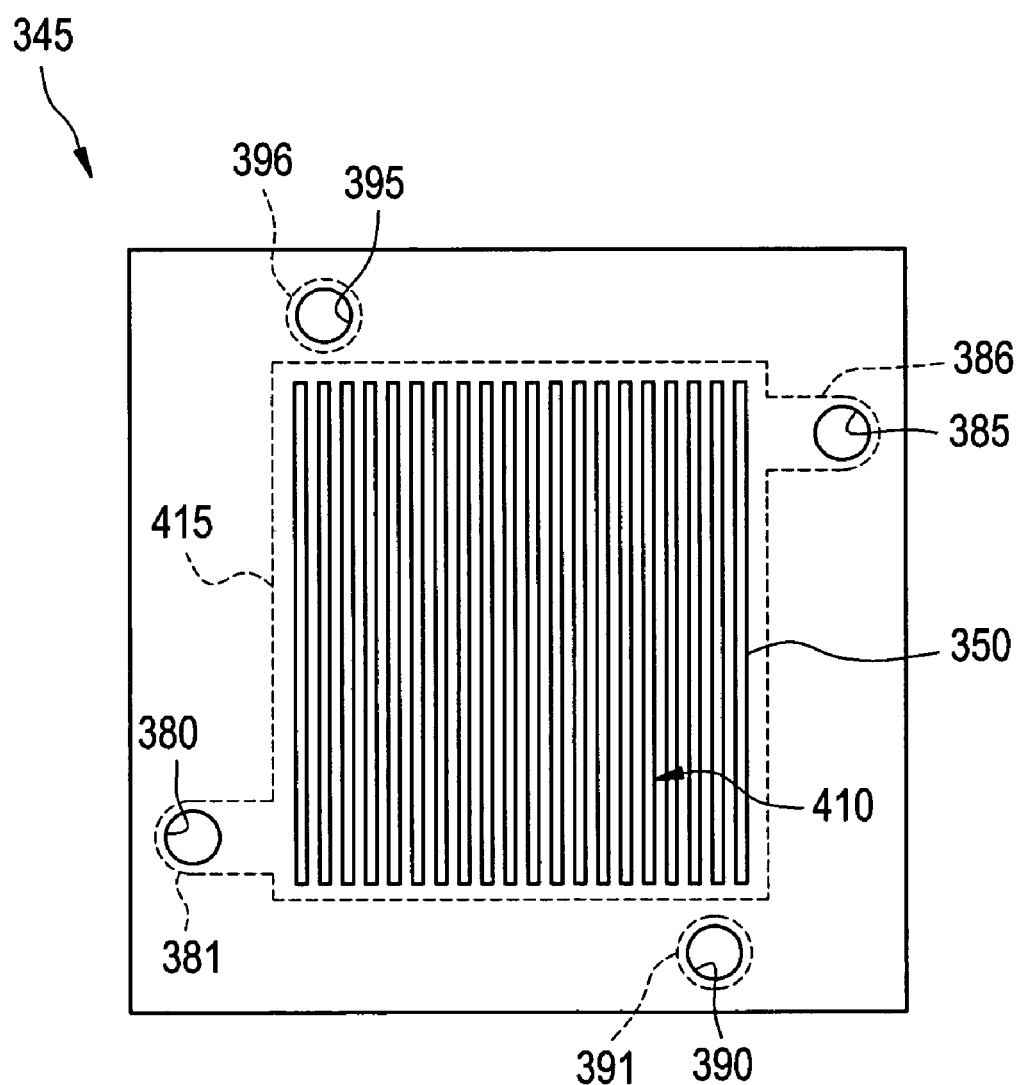
FIGS. 7-9 depict plan views of alternative sealing arrangements in accordance with embodiments of the invention.

In an embodiment, and referring now to FIGS. 6 and 7, an exemplary first layer 345 of a laminated bipolar plate 210' having a first active area 410, defined by the first plurality of channels 350, is sealed to third layer 365, via diffusion bonding or other suitable means, at the perimeter 415 of first active area 410, and each inlet and outlet port 380, 385, 390, 395 is sealed to third layer 365, via diffusion bonding or other suitable means, at each respective perimeter 381, 386, 391, 396, thereby controlling fluid flow within and between each sealed region. As depicted, inlet 380 and outlet 385 ports of first layer 345 have sealing lines 381, 386 that are integral with sealing line 415 of first active area 410, thereby enabling fluid flow to pass from the port regions 380, 385 to the first set of header channels 370 and the first plurality of through channels 350, when first layer 345 is bonded to third layer 365. Although not specifically shown, it will be appreciated that a similar arrangement exists with the sealing of second layer 355 and third layer 365, thereby enabling fluid flow to pass from the port regions 390, 395 to the second set of header channels 375 and the second plurality of through channels 360.

While embodiments of the invention have been described employing a laminated bipolar plate 210' having only three layers 345, 355 and 365, it will be appreciated that the scope of the invention is not so limited, and that the invention may also apply to bipolar plates having more than three layers.

Figure 8:
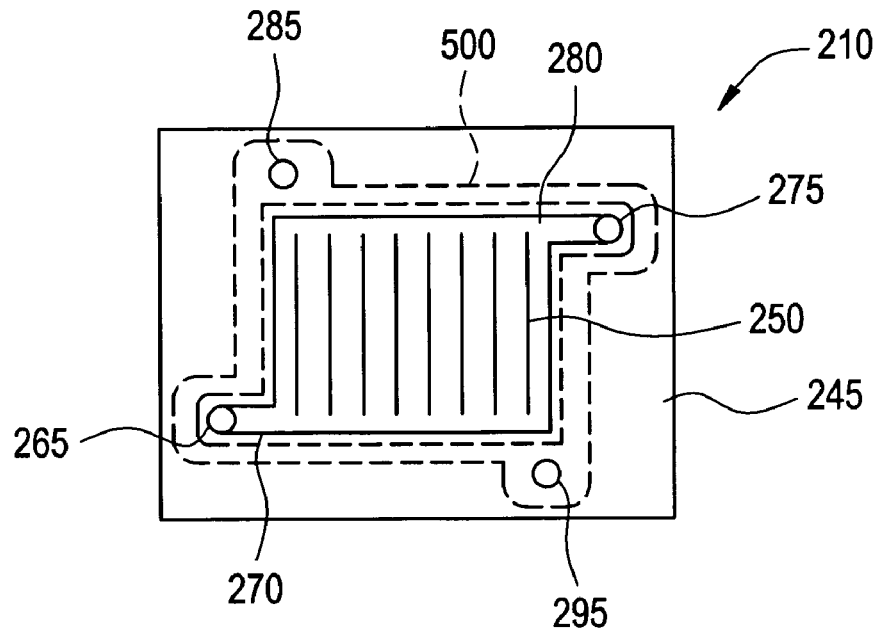
Figure 9:
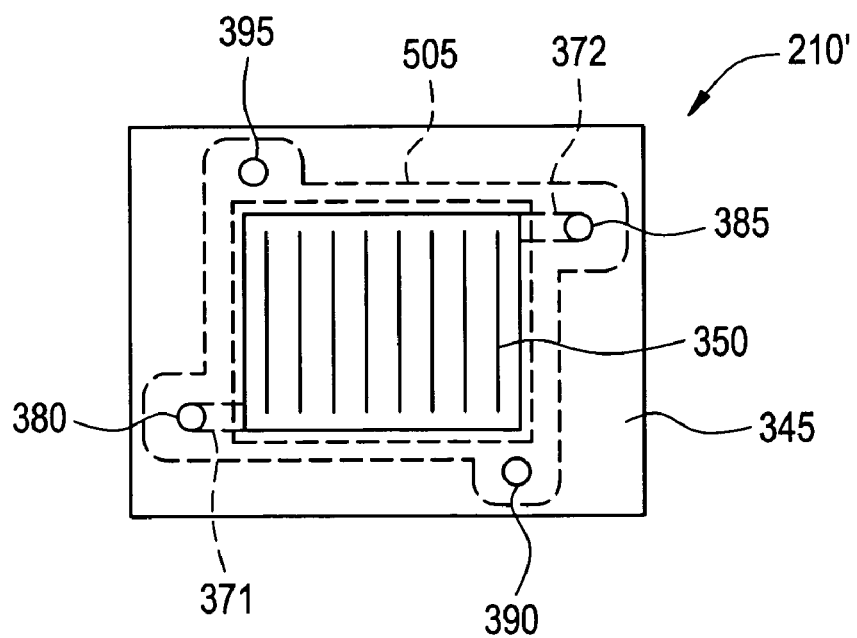

Referring now to FIGS. 8 and 9, front plan views of bipolar plates 210 and 210' are depicted with sealing regions 500 and 505, respectively, being defined by the region between the dashed lines illustrated on the outer surfaces of the respective bipolar plate. As will be discussed in more detail below, these sealing regions provide a fluid flow seal when the bipolar plates are arranged in cell 200 with adjacent gaskets 225 (see for example FIGS. 2 and 3) in accordance with embodiments of the invention. FIG. 8 depicts the first side 245 of unitary bipolar plate 210 (see FIG. 4), while FIG. 9 depicts the first layer 345 of laminated bipolar plate 210' (see FIG. 6). In reference to FIGS. 8 and 9, the first plurality of flow channels 250 and the first plurality of through channels 350 are also herein referred to as first fluid flow regions, with second fluid flow regions being defined by the companion flow channels 260 and through channels 360 on the opposite side of plates 210 and 210'. Accordingly, FIGS. 8 and 9 are used herein to refer to both the first and the second fluid flow regions of plates 210, 210'.

Referring to FIG. 8, sealing region 500 of bipolar plate 210 extends around the entire perimeter of inlet port 285 and outlet port 295, but extends around only an outer portion of inlet port 265 and outlet port 275, which is due to header channels 270 and 280 being in fluid communication between inlet port 265 and first fluid flow region 250, and between first fluid flow region 250 and outlet port 275. While not specifically illustrated, it will be appreciated that a similar sealing arrangement exists on the opposite side of plate 210 with the opposite sets of inlet and outlet ports.

Referring to FIG. 9, sealing region 505 of bipolar plate 210' extends around the entire perimeter of both inlet ports 380 and 390, and both outlet ports 385 and 395, which is possible since through channels 371 and 372 of the first set of header channels 370, and likewise through channels 376 and 377 of the second set of header channels 375 (see FIG. 6 for example), are formed in the third layer 365 of the laminated bipolar plate arrangement.

As such, and with reference to FIGS. 8 and 9 collectively, it can be seen that bipolar plate 210, 210' includes a first side 245, 345 having a first fluid flow region 250, 350 bordered by a first sealing region 500, 505, and a second side 255, 355 having a second fluid flow region 260, 360 bordered by a second sealing region (depicted generally by numerals 500, 505).

Sealing regions 500, 505 will now be discussed in more detail with reference to FIGS. 10-13. In general, sealing regions 500, 505 include a plurality of non-continuous sealing features that have overlapping ends, thereby creating a circuitous path on the outer surface of first side 245 or first layer 345 from the fluid-flow region 250, 350 across the sealing region 500, 505 to the edge of the bipolar plate 210, 210'. In an embodiment, the non-continuous sealing features in sealing regions 500, 505 extend around the perimeter of the respective fluid flow region 250, 350.

Figure 10:
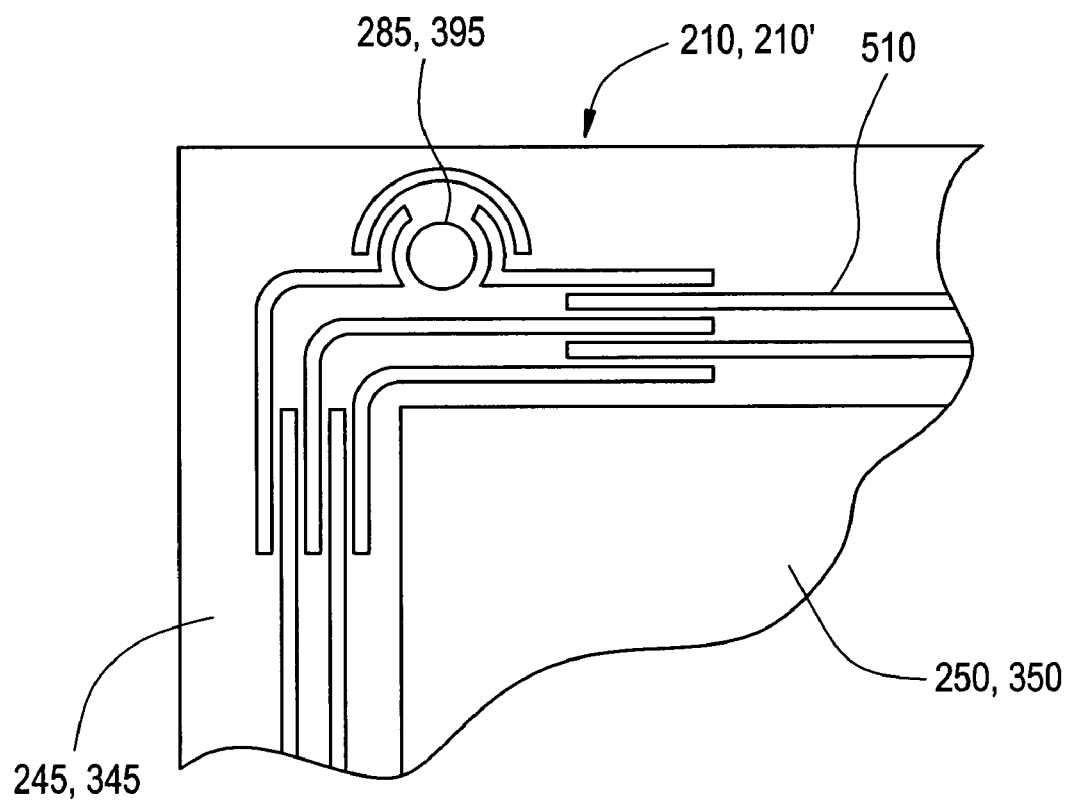
FIGS. 10-13 depict partial plan views of sealing features in accordance with embodiments of the invention.

In an embodiment, and referring now to FIG. 10, the plurality of non-continuous sealing features 510 may be etched depressions (channels) or projections (ridges) on an outer surface of bipolar plate 210, or may be through slots (channels) cut through first and second layers 345, 355 of bipolar plate 210'.

Figure 11:
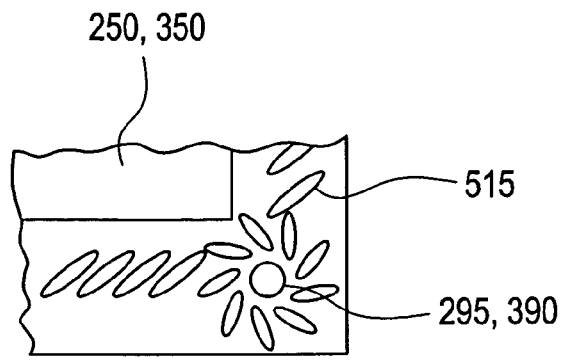
Figure 12:
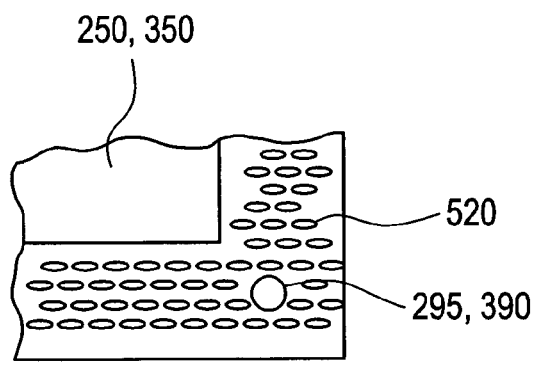
Figure 13:
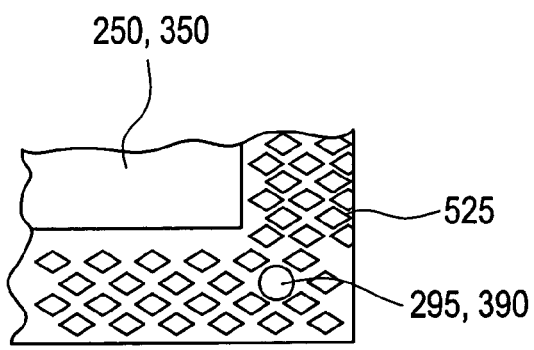

In another embodiment, and referring now to FIGS. 11-13, the plurality of non-continuous sealing features may be a series of repetitive patterns 515, 520, 525 that may be depressions or projections on an outer surface of bipolar plate 210, or holes cut through first and second layers 345, 355 of bipolar plate 210'. As depicted, the repetitive patterns 515, 520, 525 may be ovals 520, pointed ovals 515, diamond shapes 525, or any other shape suitable for the purposes disclosed herein. Accordingly, while embodiments disclosed herein illustrate specific geometric shapes for the sealing features 510, 515, 520, 525, it will be appreciated that other shapes suitable for the purposes disclosed herein may also be applicable, and that the scope of the invention is intended to encompass such shapes. As depicted in FIGS. 12-13, the plurality of non-continuous sealing features 520, 525 may be arranged as a matrix of repetitive patterns, the repetitive patterns in each row of the matrix being staggered with respect to an adjacent row, thereby creating a circuitous path on the outer surface of first side 245 or first layer 345 from the fluid-flow region 250, 350 across the sealing region 500, 505 to the edge of the bipolar plate 210, 210'. In an alternative embodiment, sealing features 515, 520, 525 maybe randomly arranged, as long as they produce the aforementioned circuitous path from the fluid-flow region 250, 350 across the sealing region 500, 505 to the edge of the bipolar plate 210, 210'. While embodiments disclosed herein illustrate a specific number of rows of patterns in sealing region 500, 505 (see FIGS. 12 and 13 for example), it will be appreciated that this is for illustrative purposes only and that any number of rows suitable for the purposes disclosed herein may be employed.

As seen by referring to FIGS. 8-13 collectively, it will be appreciated that the plurality of non-continuous sealing features 510, 515, 520, 525 may extend around at least a portion of, or the entire perimeter of, a respective fluid flow port.

Where the bipolar plate is a unitary bipolar plate 210, the plurality of non-continuous sealing features may be integral with the unitary plate, and where the bipolar plate is a laminated arrangement of layers, the plurality of non-continuous sealing features may be integral with an outer layer of the laminated arrangement of layers, the outer layer 345, 355 being bonded to an adjacent inner layer 365. In an embodiment, the plurality of non-continuous sealing features integral with an outer layer of the laminated arrangement are openings that are cut through the outer layer.

Under the compressed conditions of an assembled cell 200, sealing features 510, 515, 520, 525 interact with gaskets 225, or MEA 205, to create a localized offset of the gasket material, such that the material is either locally compressed by the sealing feature being a projection, or locally expanded by the sealing feature being a depression or hole, thereby establishing a region of improved sealing at the sealing region 500, 505. Furthermore, by having a plurality of sealing features 510, 515, 520, 525 arranged adjacent to one another, mechanical creep of the soft gasket material is kept under control, thereby helping to increase the life expectancy of the cell 200.

Accordingly, and as disclosed, some embodiments of the invention may include some of the following advantages: a bipolar plate arrangement having integral therewith a sealing region for improved fluid flow sealing and gasket creep control; and, a bipolar plate having non-continuous sealing features that may be stamped to provide improved sealing around the perimeter of an active area within the electrochemical cell while also providing sufficient structural integrity to the bipolar plate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bipolar plate for an electrochemical cell, comprising:
a first side having a first fluid flow region bordered by a first sealing region; and
a second side having a second fluid flow region bordered by a second sealing region;
wherein at least one of the first and the second sealing regions comprises a plurality of non-continuous sealing features having overlapping ends, the sealing features extending around the perimeter of the respective fluid flow region;
wherein the bipolar plate is a laminated arrangement of layers; and
the plurality of non-continuous sealing features are integral with an outer layer of the laminated arrangement of layers.

2. The bipolar plate of claim 1, wherein:
the plurality of non-continuous sealing features comprises openings cut through the outer layer.

3. The bipolar plate of claim 2, wherein:
the outer layer is bonded to an adjacent layer.

4. The bipolar plate of claim 3, wherein:
the outer layer further comprises one of the first fluid flow region and the second flow region; and
the adjacent layer comprises fluid flow header channels.

5. An electrochemical cell, comprising:
a plurality of membrane-electrode-assemblies (MEAs) alternatively arranged with a plurality of flow field members between a first cell separator plate and a second cell separator plate;
wherein at least one of the plurality of flow field members comprises a bipolar plate, the bipolar plate comprising:
a first side having a first fluid flow region bordered by a first sealing region; and
a second side having a second fluid flow region bordered by a second sealing region;
wherein at least one of the first and the second sealing regions comprises a plurality of non-continuous sealing features having overlapping ends, the sealing features extending around the perimeter of the respective fluid flow region;
wherein the bipolar plate is a laminated arrangement of layers; and
the plurality of non-continuous sealing features are integral with an outer layer of the laminated arrangement of layers.

6. The electrochemical cell of claim 5, wherein:
the plurality of non-continuous sealing features of the bipolar plate comprises openings cut through the outer layer.

7. The electrochemical cell of claim 6, wherein:
the outer layer of the bipolar plate is bonded to an adjacent inner layer of the laminated arrangement of layers.

8. The electrochemical cell of claim 7, wherein:
the outer layer of the bipolar plate further comprises one of the first fluid flow region and the second flow region; and
the adjacent layer of the bipolar plate comprises a fluid flow header channel.

9. A bipolar plate for an electrochemical cell, comprising:
a laminated arrangement of layers having a first side and a second side, wherein said first and second side are formed by different layers of said laminated arrangement of layers;
wherein said first side includes a first fluid flow region bordered by a first sealing region, and said second side includes a second fluid flow region bordered by a second sealing region; and,
wherein at least one of said first and the second sealing regions comprises a plurality of non-continuous sealing features having overlapping ends, the sealing features extending around the perimeter of said respective fluid flow region and are integral with an outer layer of said laminated arrangement of layers.

10. The bipolar plate of claim 9, wherein said outer layer is bonded to an adjacent layer.

11. The bipolar plate of claim 10, wherein:
said outer layer further comprises one of the first fluid flow region and said second flow region; and
said adjacent layer comprises fluid flow header channels.

* * * * *